United States Patent [19]

Lodder et al.

[11] Patent Number: 4,929,408
[45] Date of Patent: May 29, 1990

[54] METHOD OF LOCATING AN ELECTRICAL CONDUCTOR BETWEEN A FIRST EXTRUDED TUBE AND AN EXTRUDED LINING

[76] Inventors: Bernhard Lodder, Baalderesch 29, 7772 EW Hardenberg; Hendrik Severiens, De Hoge Esch 55, 7783 CB Gramsbergen; Jan A. van Houten, St. Pietersland 35, 7943 EM Meppel; Berend J. van Dijk, Prinses Marijkelaan 13, 7776 XA Slagharen, all of Netherlands

[21] Appl. No.: 337,994

[22] Filed: Apr. 14, 1989

Related U.S. Application Data

[63] Continuation of Ser. No. 102,491, Sep. 29, 1987, abandoned.

[30] Foreign Application Priority Data

Sep. 30, 1986 [NL] Netherlands .......................... 8602469

[51] Int. Cl.⁵ ............................................. B29C 47/02
[52] U.S. Cl. ..................................... 264/149; 264/150; 264/173; 264/209.4; 425/112; 425/114
[58] Field of Search ............... 264/173, 174, 508, 511, 264/209.2, 209.3, 209.4, 284, 148–151; 425/113, 114, 112; 156/244.13, 244.14, 244.15

[56] References Cited

U.S. PATENT DOCUMENTS

| 3,526,692 | 9/1970 | Onaka ................................. 264/173 |
| 3,895,085 | 7/1975 | Suzuki et al. ...................... 264/173 |
| 3,944,641 | 3/1976 | Lemelson ........................... 264/150 |

FOREIGN PATENT DOCUMENTS 159733 10/1985 European Pat. Off. .

Primary Examiner—Jill L. Heitbrink
Attorney, Agent, or Firm—A. Robert Theibault

[57] ABSTRACT

Electroweldable pipe sockets and fittings by forming a first tube being internally sized and cooled and on the outer side provided with a groove, having preferably a raised edge part, winding an electrical conductor in the groove, and the outer side of the first tube with electrical conductor is coated with plastics thereby maintaining the internal size of the first tube by internal cooling and sizing. In this continuous process the speeds of the first tube and of the continuous tube leaving the coating extrusion stage are equal. In the coating extrusion stage a negative pressure is maintained between the first tube and the coating to be applied.

6 Claims, 4 Drawing Sheets

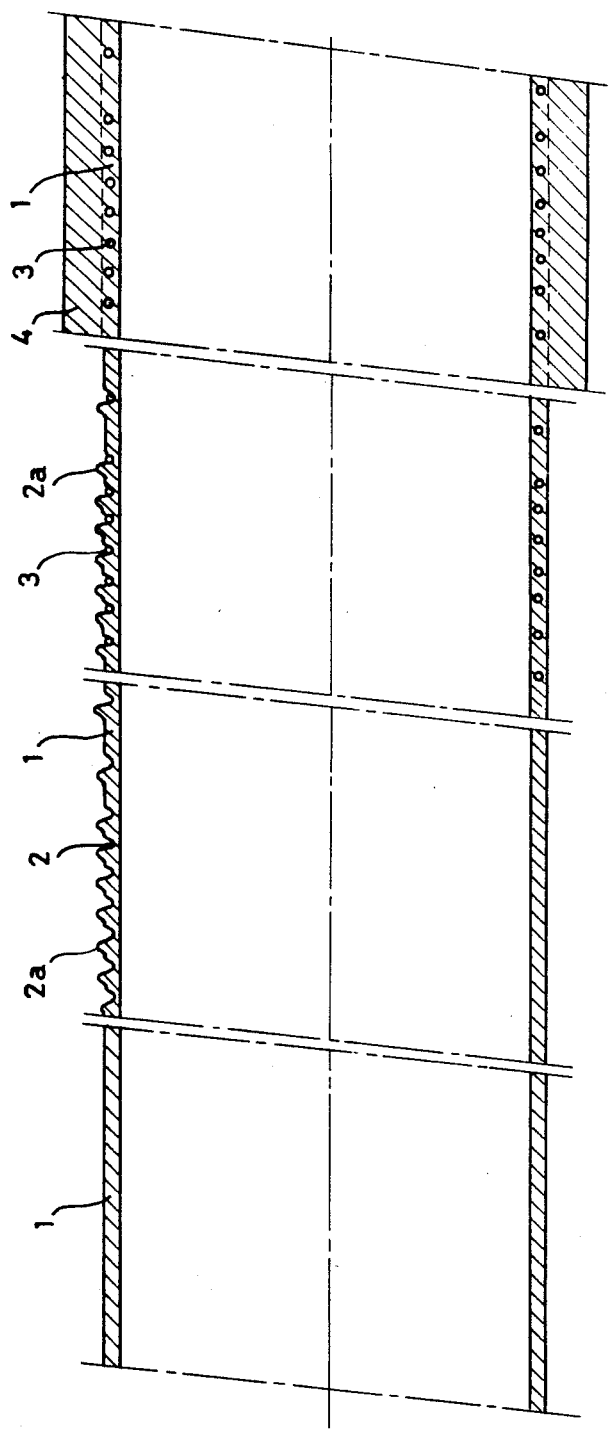

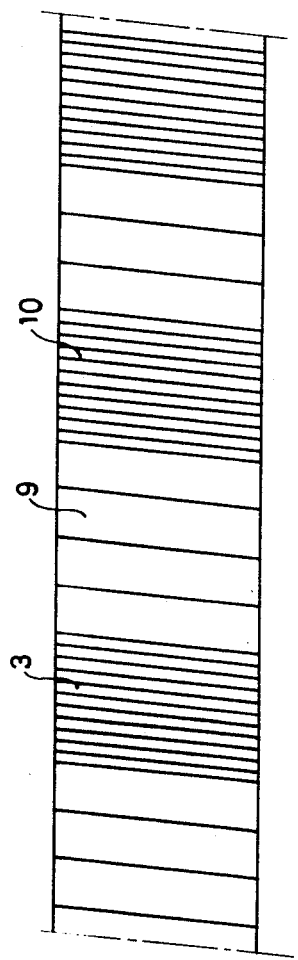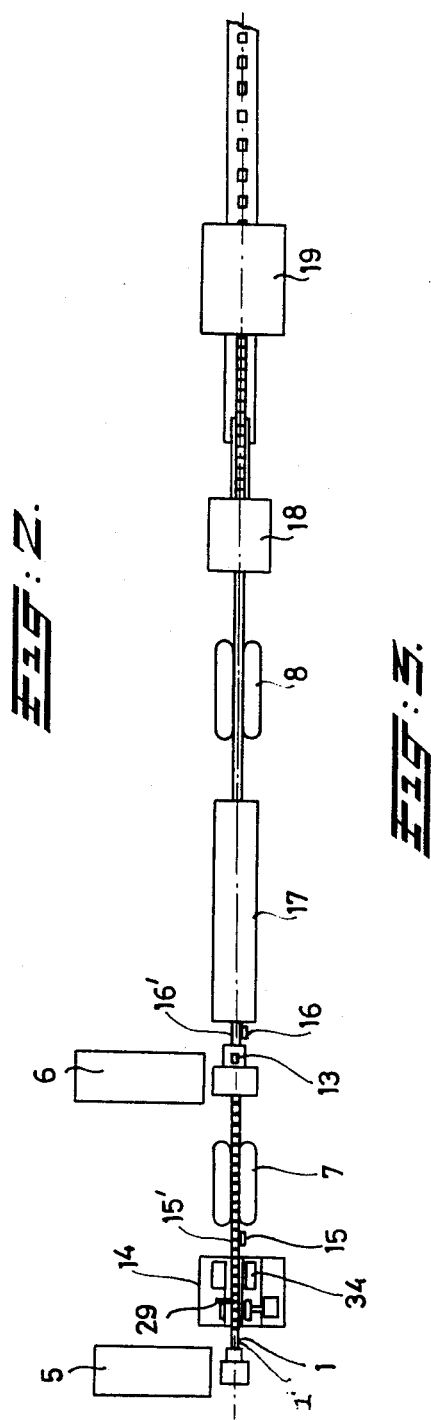

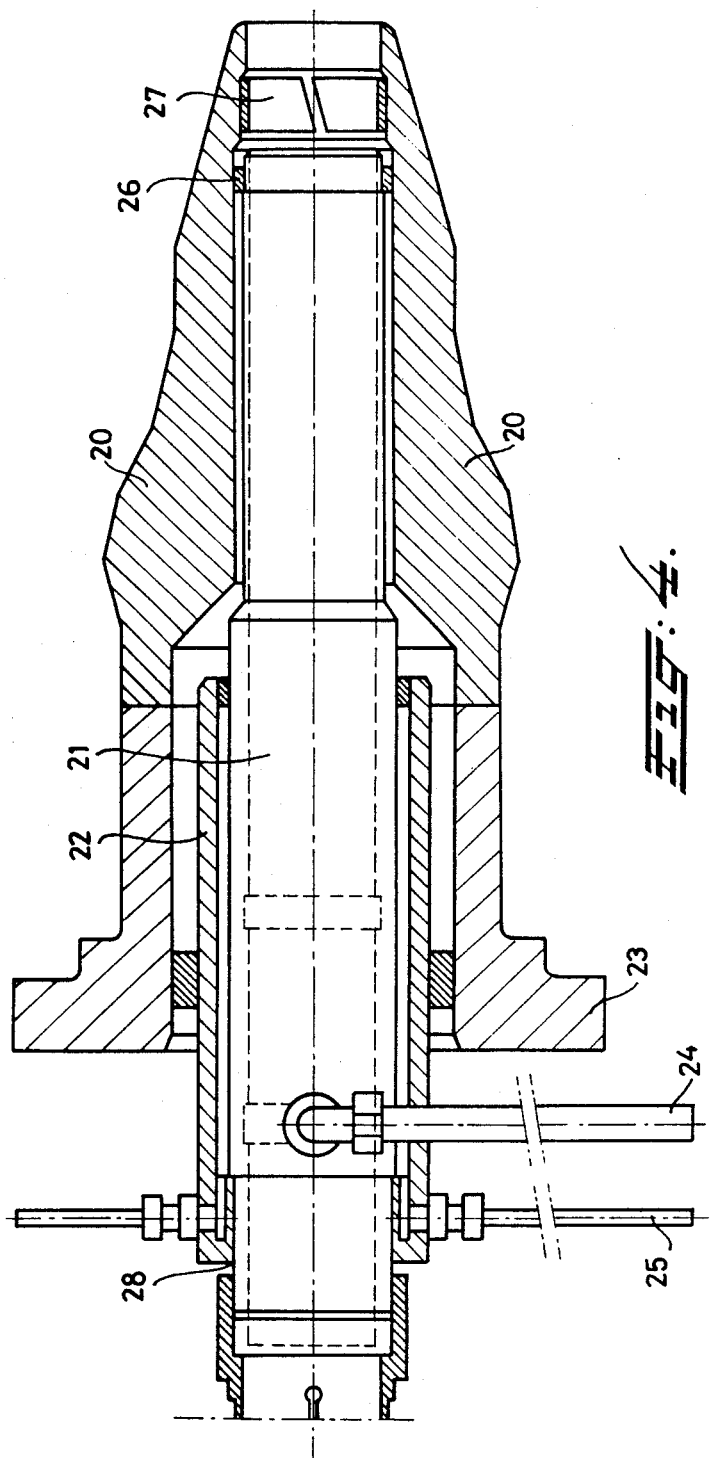

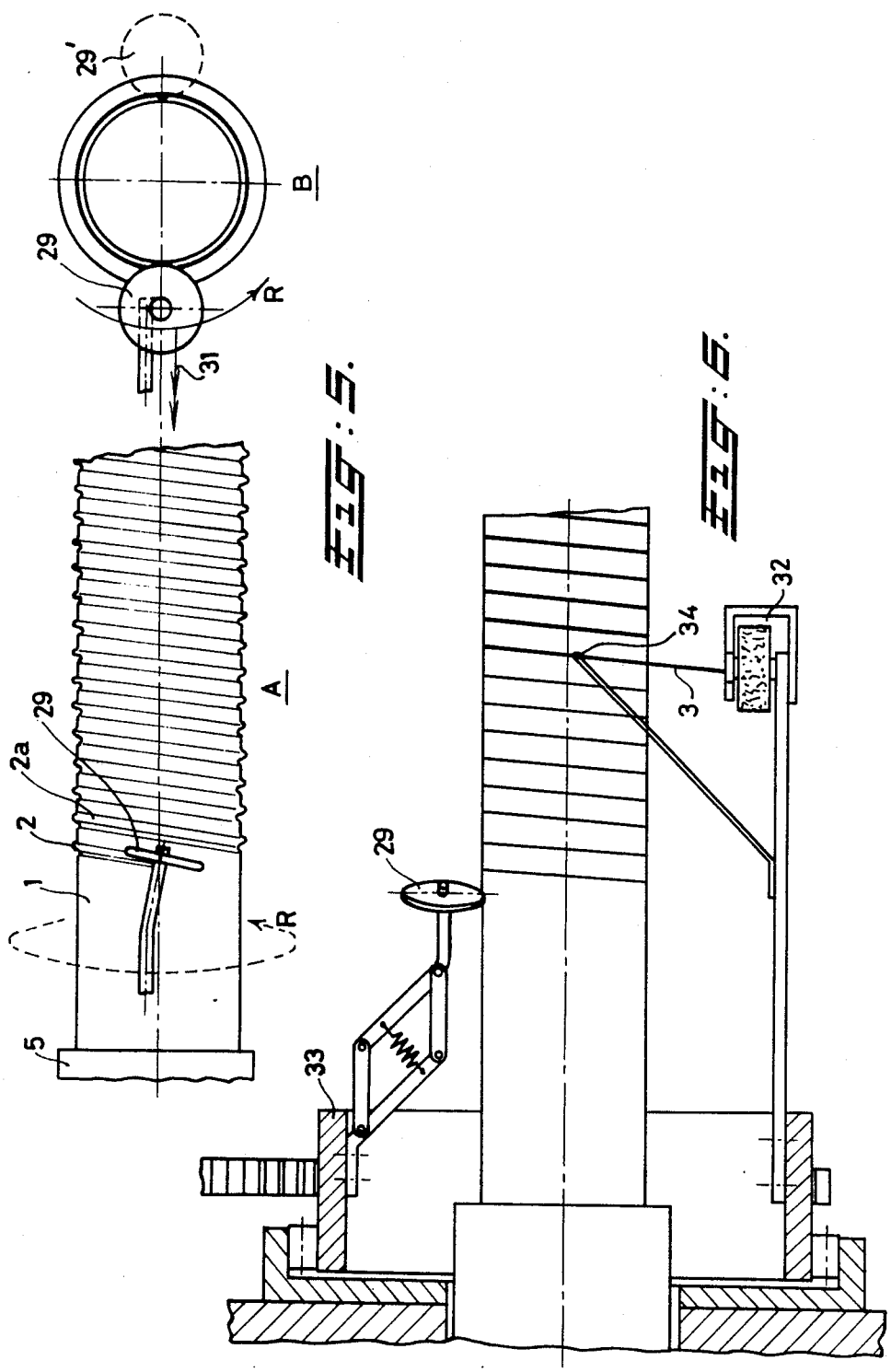

METHOD OF LOCATING AN ELECTRICAL CONDUCTOR BETWEEN A FIRST EXTRUDED TUBE AND AN EXTRUDED LINING

This application is a continuation of application Ser. No. 102,491 filed Sept. 29, 1987, now abandoned.

BACKGROUND OF THE INVENTION

1. Field of the Invention

The invention relates to a method, an apparatus and an extrusion die of producing electroweldable sockets and fitting by extrusion.

2. Description of the prior art

A method of this type is known from European Patent Application No. 0 159 733.

According to this prior art method an electric conductor is wound on a spiral groove on the outer side of a first preformed pipe part, whereupon this assembly is provided with a coating in a coating extruder having a transverse head, so as to form a continuous tube which is divided into electroweldable sockets and/or electroweldable fittings of the desired length.

This known method present the disadvantages that the regularity of the inner diameter of these known electroweldable sockets leaves much to be desired.

SUMMARY OF THE INVENTION

The invention now aims to provide a method which obviates this disadvantage.

This aim is achieved by means of a method of producing, by extrusion, electroweldable sockets and/or electroweldable fittings of thermoplastic material which are provided at least locally on the inside with at least one electrical conductor extending helically substantially in a cylindrical plane, wherein a tube provided on the outer side with at least one spiral groove and having a smooth inside wall is fed to a coating extruder after at least one electrical conductor has been fitted into the spiral groove or grooves, whereby a coating of thermoplastic material is applied to the outer side of the first tube to form a continuously interfused tube provided with said electrical conductor, while the continuous tube is divided into electroweldable sockets and/or electroweldable fittings of the desired length, wherein in a first extrusion stage by means of a first extruder a first tube is formed, which is internally sized and cooled and in the plastic state is provided on the outside with at least one spiral groove, at least one electrical conductor is wound into one groove, and the resulting tube with its electrical conductor is fed to the coating extruder situated in line with the first extruder, the speeds of the first tube from the first extruder and of the continuous tube from the coating extruder being adjusted to one another and the diameter and circular shape of the interior of the first tube, which were adjusted by the sizing of the first tube, being maintained in the cooled continuous tube.

In consequence of the internal sizing a first tube is obtained which has a very accurately determined inside diameter when cooling has been completed, this inside diameter being retained in the completed electroweldable socket or electroweldable fitting.

The internal sizing of the first tube also makes it possible for the spiral groove to be rolled in the outer wall of the first tube, while no mechanical forces reclose or pull open the groove during the solidification of the first tube. The winding of the electric conductors can thus be satisfactorily dimensioned, so that no undesirable shortcircuiting will occur.

By winding the electric conductors into the groove only after the solidification of the first tube, problems are also avoided in connection with the shrinking of the plastics material, which would lead to a reduction of the diameter of the plastics tube while the length of the conductor wires would remain unchanged, so that the windings would become loose.

After having applied the electric conductors in the groove, the inside sizing of the first tube forms an assembly whose circumferential length is very stable, while the coating of the first tube has little effect on its inner circumference and the electric conductors do not vary in length.

This makes it possible to produce a fitting or electroweldable socket in which good regularity of the inside diameter is ensured at low cost.

Through the accurate adjustment of the output and temperature of the coating extruder a good connection is obtained between the outer wall of the first tube and the coating material, and the adjustment of the output affects the external appearance of the coating layer.

Since the application of internal sizing and cooling of the first tube ensures free access to the outer wall of the tube from the extrusion head to the drawing device, the rolling of the groove and the winding of the conductor wires can be completely interconnected without being hampered or impeded by the cooling and/or sizing.

In addition, by coupling the speed of the grooving roller to the winding speed it is possible for the winding in selected spaces to proceed very slowly so that a very high pitched is obtained or to proceed normally so as to obtain a normal pitch with optimum welding quality, or else to proceed very quickly so that a large amount of wire is applied per unit of length of the socket, whereby the winding is short-circuited and thus a cold zone is then formed.

In the extrusion die of the extrusion stage carried out with the coating extruder, it is expedient to maintain a negative pressure between the first tube and the coating to be applied to it, whereby intimate contact between the two parts is ensured and therefore very good interfusion of the outer side of the first tube and the coating material is achieved.

A raised edge portion is preferably formed on the groove, and this portion will be heated more quickly and will also interfuse quickly with the new material.

Through the interconnection of the extrusion speeds of the first extruder and the coating extruder, for example by means of an electrical connection between the two drawing devices following the first extruder and the coating extruder respectively, the first tube is prevented from being pulled apart by the second drawing device.

It is particularly advantageous for an upsetting force to be applied to the outer wall of the first tube in the coating extruding stage carried out by the caoting extruder, whereby the groove is so to speak compacted during the heating in the coating extruder and the electric conductors are very effectively secured. This upsetting is in particular achieved by operating the second drawing device downstream of the coating extruder slightly more slowly than the first drawing device feeding the preformed first tube.

The invention also relates to an apparatus for applying the method of the invention at least comprising a coating extruder having a transverse head, a second drawing device downstream of the coating extruder, as well as a first drawing device for feeding a first tube having at least one spiral groove in which at least one electrical conductor is wound to the coating extruder, together with means for winding an electrical conductor into the spiral groove, wherein the apparatus comprises a first extruder situated in line with the coating extruder and having a transverse head, a sizing and cooling means for the internal sizing of a first tube part which is formed by the first extruder, together with at least one grooving roller device for forming at least one spiral groove in the first tube extruded by the first extruder, and also means for measuring the speeds of the first tube from the first extruder and that of the interfused tube from the coating extruder respectively, as well as means for controlling the drawing speed of the drawing machines and means for maintaining in the cooled interfused tube, which is formed by the coating extruder, the internal size obtained by the sizing of the first tube.

The temperature of the inner wall of the first tube during the application of the coating by the coating extruder is kept sufficiently low to prevent melting through, while in addition during the coating the first tube is at the same time held internally in the desired circular shape, so that no differences in wall thickness occur in the coating. In order to achieve this, cooling and sizing means are provided which are placed in the first tube part during the coating.

BRIEF DESCRIPTION OF THE DRAWINGS

FIGS. 1a to 1d show schematically the stages of the formation of a tubular part provided with an electric conductor by applying the method according to the invention for the production of electroweldable sockets;

FIGS. 2 shows schematyically on a larger scale the variation of the density of winding in the axial direction in a tube part of this type;

FIG. 3 shows schematically an arrangement of an apparatus for applying the method according to the invention;

FIG. 4 shows a mandrel with a guide bush disposed therein for an extrusion die of a coating extruder to be used in the apparatus according to the invention;

FIG. 5 shows a groove roolling device in the operative position for rolling a groove in a first tube part, shown on a larger scale;

FIG. 6 is an elevation of a rotating frame provided with a plurality of grooving rollers and magazines for electrical conductors and winding heads.

DETAILED DESCRIPTION OF PREFERRED EMBODIMENTS

In FIG. 1a a first tube part 1 formed in a first extruder is shown. While still in the plastic state the first tube part as formed is provided on the outer side with a groove 2 and is given stability of shape by internal cooling and sizing. For the purpose of forming a groove of this kind it is advantageous to employ a method by which the groove is rolled in the material by means of a thin wheel. In the formation of the grooves 2 the edge 2' of each groove is preferably provided with a raised edge part 2a, whereby optimum connection to the coating to be subsequently formed on the outer side of said tube part 1 is ensured.

FIG. 1c shows that the groove 2 receives electrically conductive material 3, which is disposed therein by winding and forms an electrical conductor. The electrically conductive material 3 may consist of resistance wire, resistance strip, resistance wire stranded to form a cable, resistance wire woven to form a fabric, or the like.

FIG. 1d indicates that the tube shown in FIG. 1c and equipped with electrical material 3 is covered on the outer side with a coating layer 4 fs plastic material by means of a coating extruder. Through internal cooling and sizing the first tube during, and optionally after, the coating extrusion, the correct size achieved after the first extrusion, grooving, sizing and cooling is maintained in the coating extruder subsequently. This is of particular importance for electroweldable sockets which have to be produced with very close internal tolerances.

FIG. 2 indicates schematically that the density of the winding in the longitudinal direction of the first tube formed can be intentionally varied in order to form regions 9 of, for example, low density of winding and regions 10 of relatively high density of winding. Regions having a high density of winding will for example correspond to that portion of an electroweldable socket which will subsequently melt when put into use, while the portion 9 will be situated at the place where the tube will be cut through for the purpose of cutting the sockets to lenght. The "cold" regions corresponding to the ends of the electroweldable sockets or fittings can be formed on the one hand by using a very low winding concentration or on the other hand by winding with such density that the turns shortcircuit one another.

The provision of the necessary contacts in the wall of the tube passing out of the coating extruder, which enable an external current source to be connected to the windings so that the latter become hot and thus a sleeve, which has been placed in position, can interfuse with the pipe parts which have to be joined to one another, is known per se and will not be further discussed here. Contact pins of this kind are generally installed in a separate station after the completely finished tube has been given its definitive size and shape.

FIG. 3 shows schematically a continuously operating apparatus for applying the method according to the invention. This apparatus comprises a first extruder 5 and a coating extruder 6 disposed in line therewith. The first extruder supplies a first tube 1, which is provided with a groove and after being internally cooled and sized is provided in station 14, by means of a winding head 34, with a winding of electrically conductive material for example resistance wire. The first tube 15' thus formed is delivered with the interposition of a drawing device 7 to the coating extruder 6, provided with a transverse head, in which the first tube together with its electrically conductive material is covered with thermoplastic material, while the internal size of the first tube is maintained by appropriate internal cooling and sizing of the first tube during the coating with thermoplastic material in the transverse extrusion head of the coating extruder 6. A cooled drag piston 13 is preferably disposed in the first tube during the coating with plastics material, this piston also maintaining the circular internal shape of the first tube. By measuring the speed of the first tube 1 by means of a measuring instrument 15 and that of the coated tube by means of the measuring instrument 16 it is possible to keep the speeds of the two parts equal by controlling the drawing devices, the extrusion speed, and the like by means of a controlling station 18.

The coated product 16 is additionally cooled externally in a cooling station 17, expediently while maintaining the internal cooling and sizing of the first tube 1 during this cooling of the completely coated tube 16', which is thereupon fed by means of another interposed drawing device 8 and a measuring and controlling station 18 to a station 19 for the fitting of electrical contacts and the division of the shaped tube into sockets and/or fittings of the desired length.

FIG. 4 shows an extrusion head of the coating extruder, equipped with a mandrel 20 provided with a guide bush 21 partly surrounded by a cooling jacket 22, so that coolant can flow through the connection 25 around at least a part of the guide bush 21.

The cooling jacket 22 is fastened at one end by means of a weld 28 to the guide bush 21, and at the other end the two parts are joined together by a ring welded to both parts 21 and 22. The guide bush 21 is fastened in the mandrel, with thermal insulation by means of a thermal insulation ring 23, particularly an asbestos ring, and a thermal insulating ring 26 of asbestos or Teflon ®.

In order to prevent the preformed first tube 1 from fusing to the mandrel 20, a ring 27 of thermal insulating material is disposed in the mandrel, its inside diameter being smaller than or at most equal to the inside diameter of the guide bush.

A vacuum connection 24 is provided for producing a vacuum in the interior of the mandrel for the purpose of achieving better adhesion of the coating to the first tube equipped with electrically conductive material. The mandrel and its guide bush described here is connected in the usual manner to the remainder of an extrusion head.

In order to give some idea of the production speeds which can be achieved with the method according to the invention, reference is made to the following table.

| Inside diameter of socket | Pitch in mm | Wire thickness mm | Speed mm/min. |
| --- | --- | --- | --- |
| 25 mm | 1.3 | 0.4 | 2.14 |
| 63 mm | 2 | 0.6 | 0.76 |
| 180 mm | 3.2 | 1.6 | 0.2 |

In order to form a spiral groove 2 in the first tube coming from the first extruder 5 a grooving roller device 29 is provided, which can be moved on its pivot 31 out of its operative path in the outward direction, so that the first tube can freely pass this grooving roller device in the event of a breakdown and on the starting-up of the apparatus. In such cases the grooving roller device 29 can be stopped without damage (see FIG. 5).

If a grooving roller device 29 is set at an angle to the axis of the first tube part, the plastics material pressed away will form a raised edge 2a on the edges 2' of the groove 2, so that optimum joining of the first tube part 1 to the electrical conductors 3 will be facilitated.

In order to achieve completely synchronous operation of the grooving roller device 29 and a winding head 24 for winding the electrical conductor 3 in the groove 2 of the first tube 1, a fixed connection 30 is provided between them.

In addition, regulating means 32 are provided for the purpose of controlling the speed of groove formation and the winding speed for the winding of the electrical conductor in accordance with a predetermined program, and in this way forming regions 10 having a high density of winding and regions 9 having a low density of winding.

It is expedient for one or more grooving rollers 29, 29' to be fastened on a rotating frame 33, on which the winding head or winding heads 34 for winding the electrical conductor is or are mounted.

A plurality of magazines 34 for the electrical conductor 3 can preferably be mounted on the rotating frame 33, the magazines 34, which decrease in weight during the winding, being distributed uniformly over the periphery, so that once balancing has been achieved at the commencement of production it can be maintained continuously.

The plastics materials of the first tube 1 and the coating material are expediently the same, and in any case must be able to be welded to each other. The interal sizing and cooling means for cooling and sizing the first tube 1 are schematically indicated by 1'.

What is claimed is:

1. A method of producing by extrusion, electroweldable fittings of thermoplastic which are provided internally with at least one electrical conductor extending helically substantially in a cylindrical plane wherein a first tube is provided on its outer side with at least one spiral groove and on its inside wall with a smooth surface, said first tube is fed to a transverse lining extruder after said at least one electrical conductor has been fitted into the spiral groove whereby a lining of thermoplastic material is applied to the outer side of the first tube in excess of the wall thickness of the first tube to form a continuously interfused tube provided with said electrical conductor located internally, and the continuously interfused tube is divided into electroweldable fittings of a desired length; wherein a first extruder in a first stage extrudes the first tube which is non-rotating and is internally sized and cooled, while said first tube is in a plastic state and non-rotating said at least one spiral groove being formed on the outer side of the first tube, introducing at least one electrical conductor into said at least one spiral groove after cooling and internal sizing of said first tube, and feeding the first tube with the electrical conductor to the lining extruder and applying the lining, the lining extruder being positioned in line with the first extruder, the speeds of the first tube from the first extruder and the continuously interfused tube from the lining extruder are adjusted to one another, the continuously interfused tube being cooling and non-rotating and the diameter and circular shape of the inside wall of the first tube are maintained in the cooled continuous non-rotated interfused tube with the electrical conductor close to the inside wall.

2. The method as claimed in claim 1, wherein the speeds of the first tube and of the continuously interfused tube are kept substantially equal to each other.

3. The method as claimed in claim 1, wherein the formation of a spiral groove in the first tube forms a raised edge part in edges of the groove.

4. The method as claimed in claim 1, wherein at least during the lining extrusion by the lining extruder the first tube is internally cooled and kept at the size obtained by the internal sizing of the first tube, while the interfused tube obtained by the lining extruder is cooled externally.

5. The method as claimed in claim 1, wherein after the lining extrusion is carried out by the lining extruder the first tube is further internally cooled and held to size.

6. The method of claim 1, wherein the speed of delivery of the interfused tube from the lining extruder is slightly lower than the speed at which said first tube is fed to the lining extruder.

* * * * *

UNITED STATES PATENT AND TRADEMARK OFFICE
CERTIFICATE OF CORRECTION

PATENT NO. : 4,929,408

DATED : May 29, 1990

INVENTOR(S) : Bernhard Lodder, Hendrik Severiens, Jan A. van Houten Berend J. van Dijk, It is certified that error appears in the above-identified patent and that said Letters Patent is hereby corrected as shown below:

Line 17 between "and" and "is" insert --which--; same line before "while" insert --and--;

Line 28, change "cooling" to --cooled--;

Line 29, change "rotating" to --rotated--.

Signed and Sealed this

Thirty-first Day of December, 1991

*Attest:*

HARRY F. MANBECK, JR.

*Attesting Officer*     *Commissioner of Patents and Trademarks*